United States Patent
Lhermite et al.

(10) Patent No.: US 7,224,700 B2
(45) Date of Patent: May 29, 2007

(54) MULTIPLEXING PROCESS AND MULTIPLEXER OPTIMIZING MANAGEMENT OF DIGITAL TRANSMISSION CHANNEL BANDWIDTH

(75) Inventors: Richard Lhermite, Rennes (FR); Eric Gourmelen, Bruz (FR)

(73) Assignee: Thales, Paris (FR)

( * ) Notice: Subject to any disclaimer, the term of this patent is extended or adjusted under 35 U.S.C. 154(b) by 798 days.

(21) Appl. No.: 10/105,300

(22) Filed: Mar. 26, 2002

(65) Prior Publication Data

US 2002/0191641 A1   Dec. 19, 2002

(30) Foreign Application Priority Data

Mar. 27, 2001   (FR) ................................. 01 04115

(51) Int. Cl.
H04J 3/24   (2006.01)
H04J 3/16   (2006.01)

(52) U.S. Cl. ................... 370/468; 370/473; 370/537

(58) Field of Classification Search ........ 370/232–396, 370/411–416, 461–468, 528–538
See application file for complete search history.

(56) References Cited

U.S. PATENT DOCUMENTS

| | | | |
|---|---|---|---|
| 5,126,999 A * | 6/1992 | Munter et al. ............. 370/415 |
| 5,446,738 A | 8/1995 | Kim et al. | |
| 5,539,738 A | 7/1996 | Tibi et al. | |
| 5,663,962 A * | 9/1997 | Caire et al. ............... 370/535 |
| 5,701,292 A * | 12/1997 | Chiussi et al. ............ 370/232 |
| 5,864,556 A * | 1/1999 | Tibi et al. ................. 370/396 |
| 5,898,670 A * | 4/1999 | Hoebeke et al. ........... 370/468 |
| 5,949,792 A * | 9/1999 | Yasuda et al. ............ 370/474 |
| 6,226,264 B1 * | 5/2001 | Shibata et al. ............ 370/232 |
| 6,430,197 B1 * | 8/2002 | Park ....................... 370/471 |
| 6,584,120 B1 * | 6/2003 | Shiomoto et al. .......... 370/473 |
| 6,647,017 B1 * | 11/2003 | Heiman .................... 370/412 |
| 2006/0088098 A1 * | 4/2006 | Vehvilainen ........... 375/240.03 |

* cited by examiner

Primary Examiner—Man U. Phan
(74) Attorney, Agent, or Firm—Oblon, Spivak, McClelland, Maier & Neustadt, P.C.

(57) ABSTRACT

The disclosure relates to a process for multiplexing M services (M is an integer >1) enabling transmission of data packets of predetermined size $T_p$ at a predetermined maximum output bit rate $D_{Smax}$, characterized in that it includes storage of the incoming data of each of the M service in M associated buffers, extraction of data from the buffers, and constitution of output data packets formed from some or all of the data present in a buffer when its filling is equal to or exceeds the data packet size $T_p$.

10 Claims, 2 Drawing Sheets

MULTIPLEXING PROCESS AND MULTIPLEXER OPTIMIZING MANAGEMENT OF DIGITAL TRANSMISSION CHANNEL BANDWIDTH

BACKGROUND OF THE INVENTION

The invention concerns a multiplexing process and multiplexer enabling optimized bandwidth management of a digital transmission channel, applicable notably to service broadcasting systems.

DESCRIPTION OF THE PRIOR ART

Digital television programs, digital radio and multimedia services often share the same transmission channels provided by various network types: cable, satellite, radio, Internet, etc.

There are known techniques for multiplexing audiovisual services ($S_1$, $S_2$, $S_3$) at constant bit rates (as shown in FIG. 1) and at variable bit rates (as shown in FIG. 2). Bandwidth is always limited and costly, regardless of the network used to broadcast a service. Multiplexing at variable bit rates enables some improvement of bandwidth management. However, whatever the type of multiplexing used, the multiplexing algorithms all make use of padding packets $P_\varnothing$ as these enable a margin of bandwidth to be conserved to handle possible losses.

One idea for dealing with bandwidth loss resulting from the obligatory use of padding packets $P_\varnothing$ in known multiplexing algorithms is to replace the padding packets $P_\varnothing$ after the multiplexing by data D, as shown in FIGS. 1 and 2. The data D replace the padding packets $P_\varnothing$ either partially (arrow 1) leaving a part $B_\varnothing$ of the bandwidth definitively unused, or totally (arrow 2). The problem is that the broadcaster does not control this data stream since it depends on the services being multiplexed. Therefore, depending on the type of data transmitted in place of the padding packets, if the bit rate is too low, the user will find the service slow, whereas if the bit rate is too high, the receiving decoder will be unable to handle the incoming data flow.

SUMMARY OF THE INVENTION

The present invention proposes a new approach to optimized management of digital transmission channel bandwidth. It has the advantage of being easier to implement than existing multiplexers.

The invention is a process for multiplexing M services (M is an integer >1) enabling transmission of data packets of predetermined size $T_p$ at a predetermined maximum output bit rate $D_{Smax}$, characterized in that it includes storage of the incoming data of each of the M service in M associated buffers, extraction of data from the buffers, and constitution of output data packets formed from some or all of the data present in a buffer when its filling is equal to or exceeds the data packet size $T_p$.

The invention also proposes a multiplexer with M inputs (M is an integer >1) and one output enabling transmission of data packets of predetermined size $T_p$ at a predetermined maximal output bit rate $D_{Smax}$, characterized in that it includes M buffers for storage of received data for each of M incoming services, each buffer receiving data via one of said M multiplexer inputs and being connected to said multiplexer output via an election device, thus enabling extraction of data from a buffer and constitution at said multiplexer output of a data packet formed from some or all of the data present in this buffer when its filling is greater than the data packet size $T_p$.

Another object of the invention is a transmission system for various types of services using synchronous and/or asynchronous data on networks of different types, wherein the transmission chain includes:
  M inputs that acquire the data, then transform them into packets of fixed size adapted to the broadcasting protocol,
  M buffers in which the M inputs store said data packets,
  One multiplexer with M inputs connected to said M buffers, and J outputs
  J buffers connected to said J outputs of said multiplexer enabling synchronous and asynchronous data to be managed,
  J outputs that acquire the data from said J buffers, adapt them to the format of the transmission channel, then broadcast them.

BRIEF DESCRIPTION OF THE DRAWINGS

Other characteristics and advantages of the invention will become evident on reading the description below of a preferred embodiment, which is non-limitative and taken only as an example, with reference to the attached drawings of which.

DESCRIPTION OF A PREFERRED EMBODIMENT

Figure 1:
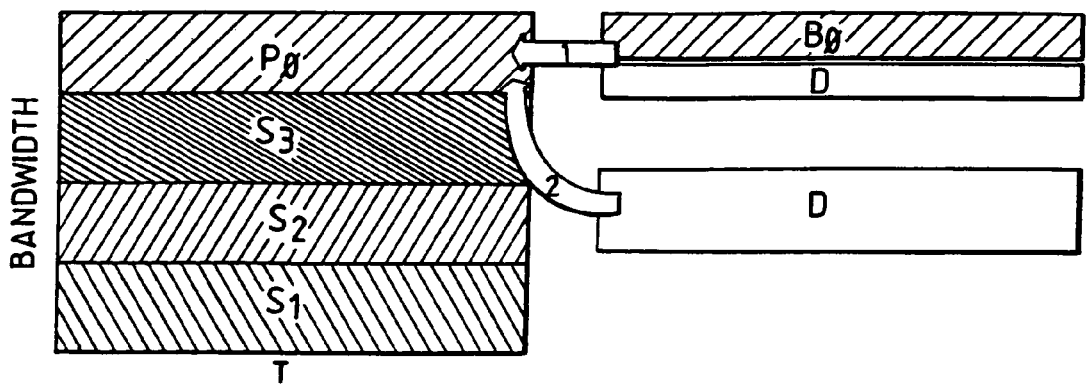
FIG. 1 illustrates prior-art bandwidth management at constant bit rate.
Figure 2:
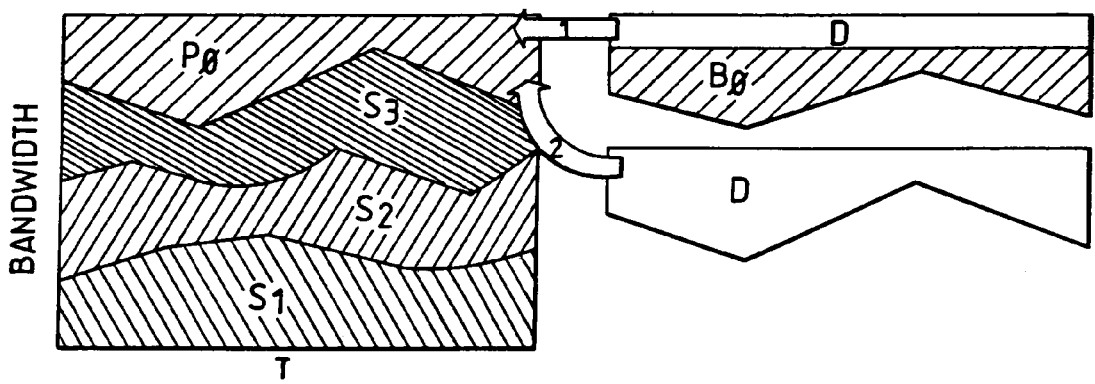
FIG. 2 illustrates prior-art bandwidth management at variable bit rate.
Figure 3:
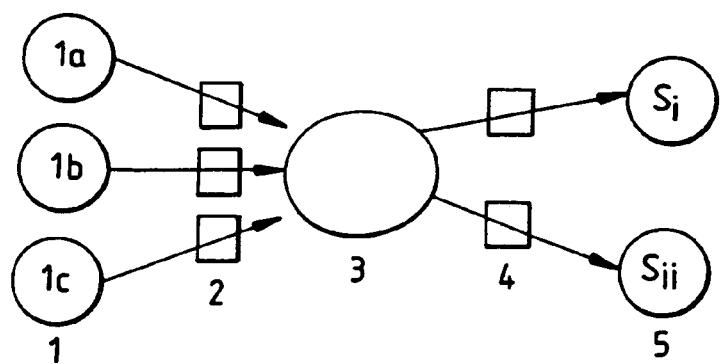
FIG. 3 shows part of the transmission chain including the multiplexer according to the invention.

FIG. 3 shows a multiplexer 3 managing input data packets of different types. These data can be video, audio or audiovisual data broadcast either immediately or later, or files or even data from a Internet-type network. These data packets are of fixed size. In the example shown in FIG. 3, one input 1a receives data for immediate broadcasting, one input 1b receives files, and one input 1c receives data from a network.

The multiplexer 3 generates a concatenation of these packets according to the real or desired transmission bit rate. Data is transferred from the inputs 1 to the multiplexer 3 via buffers 2; data is transferred from the multiplexer 3 to the outputs 5 via buffers 4. The buffers 4 are of two types: flip/flop for synchronous data, FIFO for asynchronous data. In the example shown in FIG. 3, the output $S_i$ provides for immediate broadcasting of multiplexed data, while the output $S_{ii}$ transmits the data to a network (e.g. Internet, ATM, . . . ).

The inputs 1 serve to acquire data, transform them into packets of fixed size adapted to the transmission protocol, and store them in a buffer 2 which feeds the multiplexer 3. The outputs 5 serve to acquire data from a buffer 4 fed by the multiplexer, adapt them to the transmission channel format, then broadcast them.

When the multiplexer 3 has several outputs ($S_i$, $S_{ii}$), as shown in FIG. 3, all the packets of the multiplexing core are fed to all the outputs, in this case the two outputs of the multiplexer 3. At each output the packets can then be filtered according to needs to transmit only certain packets. For example, the filtering can be carried out such that one output transmits only synchronous data, while the other transmits only asynchronous data.

Figure 4:
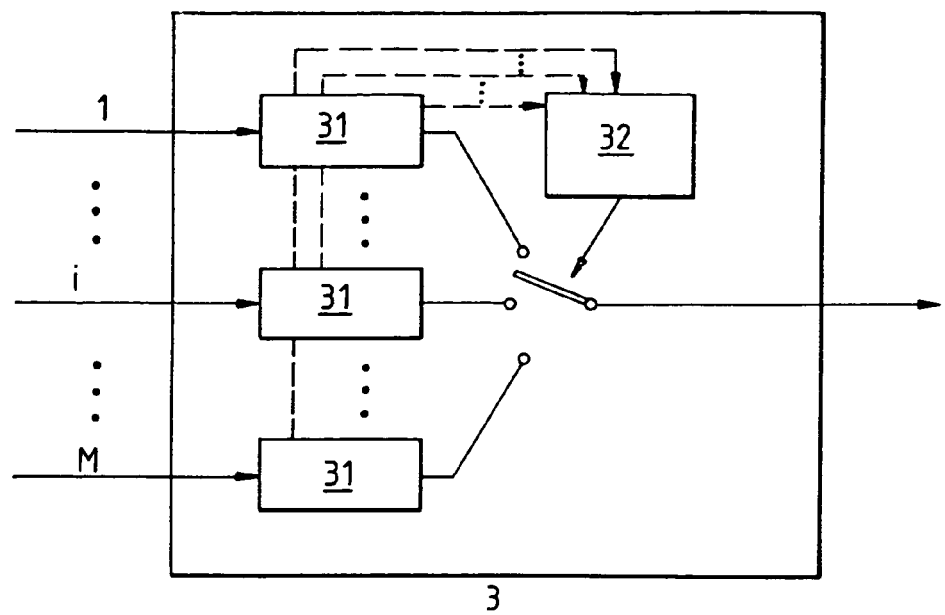
FIG. 4 shows an embodiment of the multiplexer according to the invention.

FIG. 4 shows an embodiment of the multiplexer 3 according to the invention. The multiplexer 3 includes buffers 31 and an election device 32 which controls the filling of the buffers 31 with data from the inputs and the transmission of these data at the output.

The buffers 2 are real buffers. They are filled continuously (in the case of immediate broadcasting) or block by block in the case of files.

The buffers 31 can be virtual, in other words without real existence, in which case they are tables of values. They have a predetermined filling level for a given input (fixed by the user, for example). If the filling value were the real level of buffer 2, the efficiency would be greatly degraded, particularly for asynchronous data. The filling levels would change from full to empty and, at multiplexer output, the data rate would display pronounced saw-tooth variations. In the case of transmission of a file, if the packets are read directly in a real buffer 2, instead of taking them block by block from a buffer 31, the global performance of the system would fall.

Use of the buffers 31 has the advantage of decorrelating the input data processing from the actual multiplexing. This is particularly easy if the buffers 31 are virtual.

The multiplexer 3 has M inputs on which M services are received. The data rate on each input is $\{D_E[i](t)\}_{1 \leq i \leq M}$ and the maximum bit rate acceptable by the transmission channels of all the multiplexer outputs is $D_{Smax}$. The packet time $t_p$ is then equal to $T_p/D_{Smax}$ where $T_p$ is the packet size. $B_E[i](t)$ represents the filling state of the buffer 31 of input i. The general filling principle of the buffers 31 is then:

at time $t = 0$: $\forall i \in [1, M]$ $B_E[i](0) = 0$, at time $t_{N+1} = t_N + t_p$: $\forall i \in [1, M]$ $$B_E[i](t_{N+1}) = B_E[i](t_N) + D_E[i](t_{N+1}) \cdot t_p.$$

The general principle of election of a buffer 31 to the output of multiplexer 3 implemented by the election device 32 is the following:

if $\exists i/B_E[i](t_{N+1}) \geq T_p$ then the packet of buffer 31 on input i is presented at the output, and $B_E[i](t_{N+1}) = B_E[i](t_{N+1}) - T_p$, otherwise a padding packet is presented at the output.

The multiplexing process according to the invention includes the filling of the multiplexer's internal input buffers 31 and the election of the buffer that has a filling equal to or exceeding the packet size, to send at least part of the data stored in this buffer to the output of the multiplexer 3. Padding packets are presented at the output only if no buffer is sufficiently filled. This process is easier to implement than those proposed in prior-art solutions.

We can extend this principle, to include not just one filling state per buffer 31 but two: $B_{E\ min}[i](t)$ and $B_{E\ max}[i](t)$ corresponding respectively to minimum and maximum set-point bit rates $D_{E\ min}[i](t)$ and $D_{E\ max}[i](t)$. We then have:

at time $t = 0$: $\forall i \in [1, M]$ $$B_{Emin}[i](0) = 0,$$

-continued
$$B_{Emax}[i](0) = 0,$$

at time $t_{N+1} = t_N + t_p$: $\forall i \in [1, M]$ $$B_{Emin}[i](t_{N+1}) = B_{Emin}[i](t_N) + D_{Emin}[i](t_{N+1}) \cdot t_p$$

and $B_{Emax}[i](t_{N+1}) = B_{Emax}[i](t_N) + D_{Emax}[i](t_{N+1}) \cdot t_p$

The election device 32 can choose to transmit data taken from the input buffer 31 if its minimum filling state or its maximum filling state is equal to or exceeds the packet size, by applying the following process:

1) If $\exists i/B_{E\ min}[i](t_{N+1}) \geq T_p$, then the packet coming from buffer 31 of input i is presented at the output, and $B_{E\ min}[i](t_{N+1}) = B_{E\ min}[i](t_{N+1}) - T_p$ and $B_{E\ max}[i](t_{N+1}) = B_{Elin}[i](t_{N+1})$, 2) Otherwise, if $\exists i/B_{E\ max}[i](t_{N+1}) \geq T_p$, then the packet coming from buffer 31 of input i is presented at the output, and $B_{E\ min}[i](t_{N+1}) = B_{E\ min}[i](t_{N+1}) - T_p$ and $B_{E\ max}[i](t_{N+1}) = B_{Elax}[i](t_{N+1}) - T_p$, 3) Otherwise a padding packet is presented at the output.

The bit rate set-points can be seen as a guaranteed bit rate for the minimum set-point, and the best possible bit rate for the maximum set-point.

If the minimum and maximum set-points of a service i are set to the same value, then the service i is broadcast at a fixed, guaranteed bit rate. If the minimum set-point of the service i is set to zero and the maximum set-point of this same service i is set to the maximum output bit rate, the broadcasting of the service i is then said to be "opportunistic"; in other words, the service is transmitted at a varying bit rate that depends on the free bandwidth.

In view of the simplicity of the implemented process, the buffers 31 and the election device 32 can be virtual.

In the process using the general filling/election principle and the process providing for bit rate set-points, if the buffers 31 of two inputs i and j are elected, the election conflict can be resolved by defining an order of priority of the buffers 31 which may depend on the type of service served by the buffers and/or the data rate type (opportunistic, variable guaranteed, constant) and/or the data type (audio, video . . . ) and/or the broadcaster, and so on.

Figure 5:
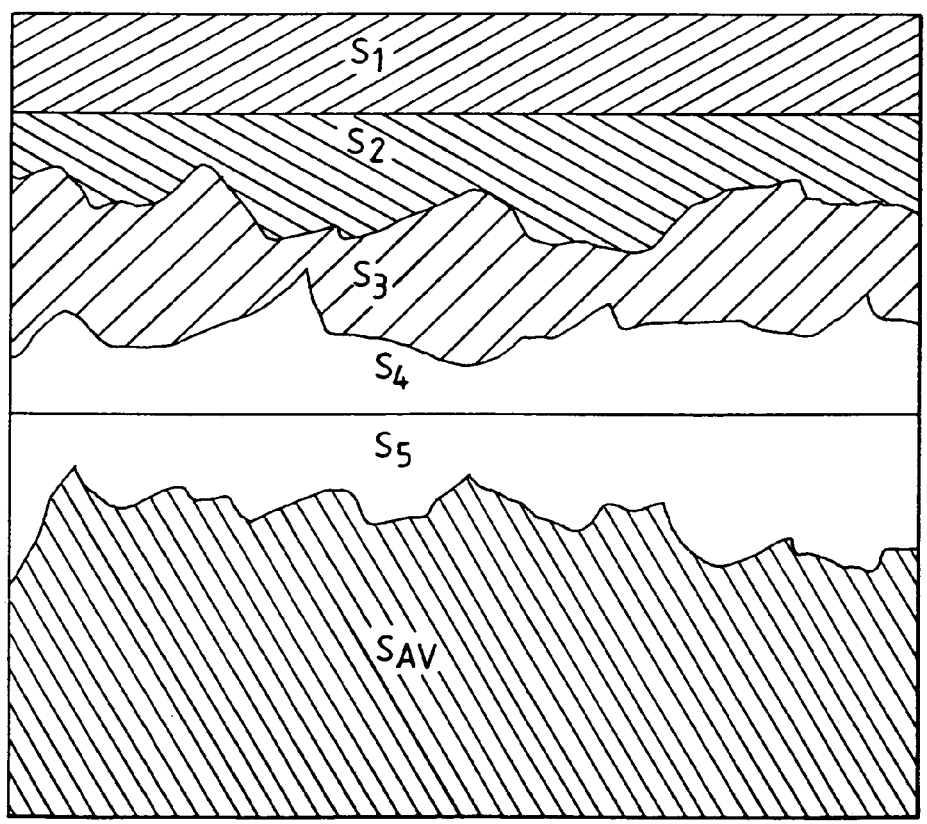
FIG. 5 illustrates bandwidth management using the multiplexing according to the invention.

FIG. 5 illustrates channel management by the multiplexer 3. In this example, six different services are sharing a given bandwidth (the ordinate is the bandwidth, the time is the abscissa). The service 1 is at constant bit rate, in other words the minimum bit rate set-point is equal to the maximum set-point for this service in the process implemented by the multiplexer 3. Services 2 to 4 have minimum set-points that are non-zero and different from their maximum set-points which are different from the maximum output bit rate $D_{Smax}$; this provides for variable bandwidth usage but guaranteed ability to transmit. The service $S_{AV}$ is direct audio/video data broadcasting at a variable, uncontrollable bit rate. Service 5 has at purely variable bit rate due to the fact that its minimum bit rate set-point has been set to zero and its maximum set-point has been set equal to the maximum output bit rate $D_{Smax}$; this service therefore uses any unoccupied part of the bandwidth.

The minimum and maximum set-point are set individually for each service: they are predefined by the service producers or broadcasters, or set according to the nature of the data used by these services: immediate or deferred transmission, data type (audio, video, files, multimedia data). To ensure acceptable quality, some services can be transmitted only at constant bit rate. For other services, a minimum set-point is required, since slowness of the service would cause inconvenience for users. For some services, the transmission bit rate must be limited to avoid the risk of saturating the receiving decoder. For certain services, such as the file downloading as a background task, the transmission bit rate is not critical, so this type of service can make use of spare bandwidth in order to optimize bandwidth management.

The multiplexing process according to the invention is therefore able to manage efficiently simultaneous synchronous and asynchronous data streams, heterogeneous inputs and outputs, and data rate constraints while guaranteeing optimal exploitation of available bandwidth on the transmission channel.

The following features distinguish the multiplexing process according to the invention from classic multiplexers:
- Use of buffers 31 enables data storage to be dissociated from the reception of data for multiplexing;
- Simplicity of the election algorithm: scanning of a table of values;
- Multi-format I/O: several inputs and outputs can be managed, and the data of each input and output can be of different type;
- Optimized management of "opportunistic" transmission mode.

What is claimed is:

1. Process for multiplexing M services (M is an integer >1) enabling transmission of data packets of predetermined size $T_p$ at a predetermined maximum output bit rate $D_{Smax}$, comprising the steps of:
    storing incoming data of each of the M services in M virtual buffers of the multiplexer, wherein the virtual buffers are tables,
    determining, based on respective priorities of (a) the virtual buffers, (b) the M services, or (c) the type of data stored in the virtual buffers, the first virtual buffer from which at least some data will be extracted when several of said virtual buffers contain data equal to or exceeding the data packet size $T_p$,
    extracting the data from the virtual buffers, and
    forming output data packets from at least some of the data present in a virtual buffer when its filling is equal to or exceeds the data packet size $T_p$.

2. The multiplexing process according to claim 1, further comprising the step of presenting a padding packet at the output when one of the virtual buffers contains less data than the data packet size $T_p$.

3. The multiplexing process according to claim 1, wherein the storage step comprises the step of filling said virtual buffers using the following relation:

$$\forall i \in [1,M] B_E[i](t_{N+1}) = B_E[i](t_N) + D_E[i](t_{N+1}) \cdot t_p$$

where $B_E[i](t)$ represents the filling of said virtual buffer of input i at time t, $D_E[i](t)$ represents the data bit rate for the input i at time t, and time $t_N = t_{N+tp}$, (with $t_p\ T_p/D_{Smax}$), the M virtual buffers being empty at time t=0, and in that, secondly, the output data transmission respects the following relation:
    if $\exists i / B_E[i](t_{+1}) > T_p$, then a packet from input i is presented at the output, and $B_E[i](t_{N+1}) = B_E[i](t_{N+1}) - T_p$.

4. The multiplexing process according to claim 1, wherein the storing step further comprises the step of filling the virtual buffers, when the service on input i has a minimum bit rate $D_{E\ min}[i](t)$ and a maximum bit rate $D_{E\ max}[i](t)$, and if $B_{E\ min}[i](t)$ and $B_{E\ max}[i](t)$ represent respectively the minimal and maximal filling of said virtual buffer of input i at time t and at time $t_{N+1} = t_N + t_p$ (with $t_p = T_p/D_{smax}$), the filling being zero at time t=0, using the following relations:

$$\forall i \in [1,M] B_{Emin}[i](t_{N+1}) = B_{Emin}[i](t_N) + D_{Emin}[i](t_{+1}) \cdot t_p$$

and $$B_{Emax}[i](t_{N+1}) = B_{Emax}[i](t_N) + D_{Emax}[i](t_{N+1}) \cdot t_p$$

and the output data transmission respects the following relations:
    if $\exists i / B_{Emin[i](tN+1)} > T_p$, then a packet from input i is presented at output, and $B_{E\ min}[i](t_{N+1}) = B_{E\ min[i](tN+1)} - T_P$ and $B_{Emax[i](tN+1)} = B_{Elin}[i](t_{N+1})$, otherwise, if $\exists i/B_{Emax}[i](t_{N+}) > T_p$, then a packet from input i is presented at the output, and $B_{Emin}[i](t_{N+}) = B_{Emin}[i](t_{N+}) \cdot T_p$ and $B_{Emax}[i](t_{N+1}) = B_{Elax[i]}(t_{N+1}) - T_p$,
    otherwise a padding packet is presented at the output.

5. The multiplexing process according to claim 1, wherein at least some of said services are presented at the output with:
    at least one of constant or variable bit rates, and
    minimal or maximal set-point bit rates, minimal and maximal set-point bit rates, or no minimal and maximal set-point bit rates.

6. Multiplexer with M inputs (M is an integer >1) and one output enabling transmission of data packets of predetermined size $T_p$ at a predetermined maximal output bit rate $D_{Smax}$, the multiplexer further comprising:
    an election device;
    M virtual buffers configured to store received data for each of M incoming services, wherein the virtual buffers are tables,
    wherein each virtual buffer receives data via one of said M multiplexer inputs and is connected to said multiplexer output via the election device, and the election device extracts based on respective priorities of (a) the virtual buffers, (b) the M services, or (c) the type of data stored in the virtual buffers, the first virtual buffer from which at least some data will be extracted when several of said virtual buffers contain data equal to or exceeding the data packet size $T_p$, and creates a data packet at said multiplexer output formed from at least some of the data present in the respective buffer when that buffer's filling is greater than the data packet size $T_p$.

7. The multiplexer according to the claim 6, wherein said election device is virtual.

8. A multiplexer with M inputs (M is an integer >1) and one output enabling transmission of data packets of predetermined size $T_p$ at a predetermined maximal output bit rate $D_{Smax}$, the multiplexer further comprising:
    an election device;
    M virtual buffers configured to store received data for each of M incoming services, wherein the virtual buffers are tables,
    wherein each virtual buffer receives data via one of said M multiplexer inputs and is connected to said multiplexer output via the election device, and the election device extracts based on respective priorities of (a) the virtual buffers, (b) the M inputs, or (c) the type of data stored in the virtual buffers, the first virtual buffer from which at least some data will be extracted when several of said virtual buffers contain data equal to or exceeding the data packet size $T_p$, and creates a data packet at said multiplexer output formed from at least some of the data present in the respective buffer when that buffer's filling is greater than the data packet size $T_p$;

wherein the multiplexer is configured to implement the multiplexing process according to claims 3 or 4.

9. Digital transmission chain for various types of services using at least one of synchronous or asynchronous data on networks of different types, comprising:
M inputs that acquire the data, then transform them into packets of fixed size adapted to the broadcasting protocol,
M buffers in which the M inputs store said data packets, and
the multiplexer, according to claim 6, with M inputs connected to said M buffers, and J outputs,
J virtual buffers connected to said J outputs of said multiplexer enabling synchronous and asynchronous data to be managed, J outputs that acquire the data from said J virtual buffers, adapt them to the format of the transmission channel, then broadcast the data from said J virtual buffers.

10. Transmission system for various types of services using at least one of synchronous or asynchronous data on networks of different types, wherein the transmission chain includes a multiplexer according to claim 6.

* * * * *